Patented Feb. 24, 1942

2,274,102

UNITED STATES PATENT OFFICE 2,274,102

PROCESS FOR MAKING ISOCHLOROPHYL-LIN-A-SODIUM AND THE PRODUCT THEREOF

Eric G. Snyder, New York, N. Y., assignor to Jovan Laboratories, Inc., New York, N. Y., a corporation of New York No Drawing. Application August 1, 1939,
Serial No. 287,753

5 Claims. (Cl. 260—314)

The present invention relates to a process for producing isochlorophyllin-$a$-sodium and to articles of manufacture containing the same.

It is an object of the present invention to provide a means for producing isochlorophyllin-$a$-sodium.

It is another object of the present invention to provide a bacteriostatic substance containing isochlorophyllin-$a$-sodium.

It is a further object of the present invention to provide bacteriostatic substances for use as therapeutic and pharmaceutic agents and containing isochlorophyllin-$a$-sodium.

Chlorophyll is the green pigment found in the chloroplasts of green plants where it is accompanied by carotinoids (carotin, xanthophyll). Two chlorophylls of differing chemical structure are always found together in the chloroplasts of green plants. These chlorophylls are known as chlorophyll $a$ and chlorophyll $b$. Chlorophyll $b$ differs from chlorophyll $a$ in having a formyl group instead of a methyl group in position 3 of the macrocyclic ring. Thus, chlorophyll $a$, insofar as its structure is known from the latest and most authentic original researches, is as follows:

*Chlorophyll a*

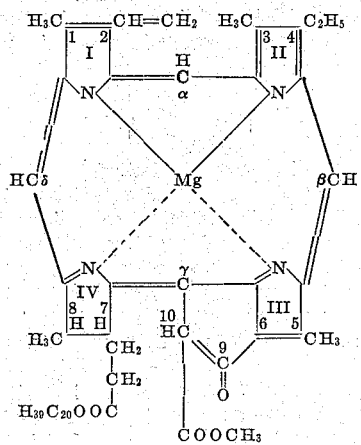

This formula represents the present state of the knowledge of chlorophyll chemistry. However, further progress of research in chlorophyll chemistry may require some minor changes. In studying the chemistry of chlorophyll compounds, the basic structure of the chlorophyll may be most easily discerned by disregarding the side chains of the chlorophyll molecule. It will be seen from the formula given hereinbefore that four pyrrole rings are bound in their alpha positions to form a macrocyclic ring. It will be easily understood that these four pyrrole rings are joined together by methine groups. The same type of structure, i. e., four pyrrole rings joined at the alpha positions by methine groups to form a macrocyclic ring is found in hemin, the prosthetic group of the blood protein haemoglobin. Hemin may be obtained from the blood protein by splitting off this prosthetic group from the protein part of the haemoglobin molecule. This similarity in structure is the reason why until recently chlorophyll and hemin and other related pigments were included in the larger group of porphyrines or porphins. However, within the last few years it has been recognized that there is a fundamental difference in structure between haemin and related compounds and chlorophyll. The two nuclear hydrogen atoms present in positions 7 and 8 in chlorophyll and green chlorophyll derivatives are absent in haemin, in haemin derivatives and in chlorophyll derivatives having a red color.

It is now generally accepted that all compounds belonging in the general classification and not having the two decisive hydrogen atoms in positions 7 and 8 are classified in the group of porphyrines or porphines. A new group term has been accepted for all compounds belonging in the general classification and having the two decisive hydrogen atoms at positions 7 and 8 in the macrocyclic ring. Such compounds having the two hydrogen atoms at positions 7 and 8 are designated as dihydroporphines or dihydroporphyrines.

In the recently published handbook by Fischer-Stern (page 41) these authorities divide the dihydroporphines into the following two groups:

1. *Bodies of the phorbide system*

Substances having the two hydrogen atoms in positions 7 and 8 and also having the isocyclic (cyclopentanon) ring on pyrrole nucleus III.

2. *Bodies of the chlorine system*

Substances having the two hydrogen atoms in positions 7 and 8 but not having the isocyclic (cyclopentanon) ring on pyrrole nucleus III.

Thus, we have the following divisions and subdivisions:

1. *Porphyrines*

Having double linkage between carbon atoms 7 and 8.

2. *Dihydroporphyrines*

Having two hydrogens at positions 7 and 8 and thus having a single linkage between carbon atoms 7 and 8.

(a) Phorbine system:

Also having the isocyclic ring present.

(b) Chlorine system:

With the isocyclic ring absent.

Those derivatives of chlorophyll having a formyl group in position 3 are derivatives of chlorophyll b. Those derivatives having a methyl group at position 3 of the macrocyclic ring are derivatives of chlorophyll a. It will be noted from the structural formula A provided hereinbefore, that in chlorophyll there are two esterified carboxyl groups, one on the side chain at position C gamma and the other on the side chain at position 7 in the macrocyclic ring. The side chain in position C gamma being an acetic group at the same time forming part of a cyclopentanon ring, which is often called the "isocyclic ring" of the chlorophyll molecule, and that in position 7 in the macrocyclic ring being a propionic acid group. The acetic acid group is esterified with methanol and the propionic acid group is esterified with phytol in chlorophyll. Saponification and splitting off of the methyl group attached to the acetic acid group at position C gamma is not possible without other simultaneous changes in the structure of the molecule. On the other hand, the phytyl group may be split off and the resulting free acid re-esterified with other alcohols. Those substances in which the propionic acid group at position 7 is a free propionic acid group, or those substances in which the propionic acid group at 7 has been re-esterified with alcohol are designated as chlorophyllids when they contain the magnesium atom in the center of the molecule. The corresponding group term "pheophorbide" includes analogous substances which are free of magnesium.

By the treatment of chlorophyllides and pheophorbides with strong alkali, a third carboxyl group is formed by the splitting of the isocyclic ring formed by the carbon atoms C gamma, a carbon atom C alpha of pyrrole ring III, the carbon atom 6 of the pyrrole ring III, the carbon atom 10 of the acetic acid group attached at C gamma and the carbon atom C 9. Substances thus obtained are tricarboxylic acids. Such substances obtained from chlorophyllids and containing magnesium are called chlorophyllins a or b. The corresponding substances obtained from pheophorbides and free of magnesium are called phytochlorins or, for brevity, chlorins if derived from pheophorbide a. The corresponding substances derived from pheophorbide b are designated as phytorhodines or, for brevity, rhodins or rhodines. Depending on the conditions under which the saponification with alkali takes place, different chlorophyllins, phytochlorins and phytorhodins are formed. Hot saponification produces products different from those obtained by cold saponification. Mixtures of saponification products are obtained when conditions during the saponification are intermediate between hot and cold. The products obtained by hot saponification (boiling) of chlorophyllids are called isochlorophyllins a or b, depending upon whether the mother substance is a chlorophyllid a or b.

Cold saponification gives chlorophyllin a or b in the restricted sense or more often mixtures of chlorophyllins and isochlorophyllins.

The products obtained by hot saponification (boiling) of pheophorbides are:

1. From pheophorbides a is obtained phytochlorin-e-6 (the index numbers giving the number of oxygen atoms), also called chlorin-e-6 or, for brevity, chlorin e or phytochlorin e.

2. From pheophorbides b, there is obtained phytorhodin-g-7, also called rhodin-g-7, or, for brevity, rhodin g or phytorhodin g.

It will be recognized that phytochlorin-e-6 and phytorhodin-g-7 are the magnesium-free substances corresponding to isochlorophyllin a and isochlorophyllin b, and may be obtained from these isochlorophyllins by elimination of magnesium with acid.

Cold saponification of pheophorbides also gives mixtures of several phytochlorins (from pheophorbides a), and several phytorhodins (from pheophorbides b). These mixtures consist of phytochlorin-e-6, and other, so-called weakly basic phytochlorins, as phytochlorin f and g, and phytorhodin-g-7 and other, so-called weakly basic phytorhodins as phytorhodin i and k.

(If cold saponification is carried out in the usual way, that is, by shaking out solutions of pheophorbides in ether or other suitable solvents with alkaline solutions, no phytochlorin e or phytorhodin g at all are formed but only the weakly basic substances phytochlorin g and phytorhodin k.)

These weakly basic phytochlorins may be obtained by elimination of magnesium from chlorophyllin a, and the weakly basic phytorhodins may be obtained by elimination of the magnesium from chlorophyllin b. However, these weakly basic phytorhodins and phytochlorins can not be obtained from the corresponding isochlorophyllins. These weakly basic chlorins and rhodins are very unstable and subject to chemical change. For these reasons, these weakly basic chlorins and rhodins, such as phytochlorin f and g and phytorhodin i and k are undesirable substances. The reason that cold saponification gives substances different from those obtained by hot saponification is that during cold saponification, an oxidation takes place in the C 10 position, changing the atomic group in position 10 from

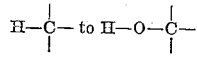

This oxidation has been called allomerization of chlorophyll or chlorophyll derivatives. It may also take place independent of saponification, all allomerized chlorophyllids giving chlorophyllins, not isochlorophyllins, and all allomerized pheophorbides giving weakly basic phytochlorins and phytorhodins on saponification, not phytochlorin e and phytorhodin g, whether saponification is hot or cold.

Willstaetter and Stoll in their investigations on chlorophyll have described a number of methods for producing different chlorophyllins by alkaline treatment of chlorophyll. However, as those skilled in the art know, the products produced by different procedures differ appreciably. Thus, as those skilled in the art know, saponification of chlorophyll with hot alaklis yields isochlorophyllins. These isochlorophyllins, although their chemical structure is not agreed upon even at the present time, are well defined insofar as, upon treatment with acid, phytochlorin-*e* is obtained from isochlorophyllin-*a* and phytorhodin-*g* is obtained from isochlorophyllin-*b*. On the other hand, saponification of chlorophyll with cold alkali gives chlorophyllins, not isochlorophyllins. These chlorophyllins are distinctly different from isochlorophyllins since upon acid treatment they yield neither phytochlorin-*e* nor phytorhodin-*g*, but from chlorophyllin-*a* phytochlorin-*g* is produced, and phytorhodin-*k* from chlorophyllin-*b*. Both of these latter products, to wit, phytochlorin-*g* and phytorhodin-*k*, are less strongly basic than phytochlorin-*e* or phytorhodin-*g*.

These observations of Willstaetter and Stoll have been confirmed by more recent investigations, which have shown that from "chlorophyllin" several weakly basic phytochlorins and phytorhodins are obtained but never phytochlorin-*e* and phytorhodin-*g*. Willstaetter and Stoll found that, when chlorophyll is saponified, often a mixture of isochlorophyllins and chlorophyllins is obtained. This has been confirmed recently by investigations which have shown that the stable compounds phytochlorin-*e* and phytorhodin-*g* or the unstable, weakly basic phytochlorin-*g* and phytorhodin-*k* may be obtained by the saponification of pheophorbides. The predominance of the stable compounds or the unstable compounds is dependent upon the conditions of saponification.

As is quite often the case in investigations of the type carried out by Willstaetter and Stoll, the only product these investigators report is the potassium salt of the material investigated. As those skilled in the art know, there is a prejudice in therapeutics to the introduction of appreciable quantities of the potassium ion into the blood stream of the higher mammals. Furthermore, no one has investigated the pharmaceutic and therapeutic value of the isochlorophyllins as bacteriostatic agents. Even the isochlorophyllin compounds described by Willstaetter and Stoll have not been the subject of such investigations.

It has now been discovered that isochlorophyllin-*a*-sodium has distinct bacteriostatic properties, particularly for tubercle bacilli of various strains.

Isochlorophyllin-*a*-sodium may be prepared by refluxing chlorophyll-*a* with an alcoholic solution of a caustic soda. During the reaction, the reaction vessel is protected from the carbon dioxide of the air by a soda-lime seal or the like. After the reaction has reached completion or approximately so, the reaction mixture is chilled to below 10° C. and filtered. The insoluble material thus obtained is washed with a solvent for chlorophyll-*a* and caustic soda, in which isochlorophyllin-*a*-sodium is substantially insoluble. For this purpose absolute ethanol is preferred. After washing with absolute ethanol the solid material is then washed with petroleum ether, for example, and redissolved in 95% ethyl alcohol. Material containing isochlorophyllin-*a*-sodium in relatively high concentration is then precipitated from the 95% ethyl alcohol solution by the addition of precipitants, preferably absolute ethanol and/or petroleum ether. The precipitated material is then separated from the liquid, washed with absolute alcohol and then with petroleum ether, and dried in vacuo.

As illustrative of the foregoing procedure, isochlorophyllin-*a*-sodium may be prepared by refluxing 1 part of chlorophyll-*a* with 10 parts of caustic soda in methyl alcohol, i. e., a methyl alcohol solution of sodium hydroxide, for at least two hours. During the refluxing operation the reaction mass is protected from the atmosphere by a soda-lime seal or carried out in an inert gas. After the reaction has practically reached completion, the reaction mass is chilled to below about 10° C., preferably by refrigeration, and maintained at a temperature below about 10° C. for a period of time, say 12 to 16 hours. Thereafter the solid material containing the isochlorophyllin-*a*-sodium which has precipitated out on standing is separated from the fluid portion of the reaction mass in a suitable manner, such as by means of a centrifuge or by filtration, and washed with absolute ethanol. The solid material is then washed with petroleum ether and redissolved in 95% ethanol, from which material rich in isochlorophyllin-*a*-sodium is precipitated by the addition of absolute ethanol and petroleum ether. The precipitate is separated from the fluid portion of the mass, washed with absolute ethanol, then with petroleum ether, and dried in vacuo. In this manner isochlorophyllin-*a*-sodium of high purity is obtained. This material may be mixed in suitable concentration with suitable vehicles to provide a pharmaceutic or therapeutic agent having bacteriostatic properties.

Isochlorophyllin-*a*-sodium is readily identified by its characteristic absorption spectra. Isochlorophyllin-*a*-sodium in an aqueous solution of about pH 7 to about pH 8 has three absorption spectrum maxima, at 639 millimicrons, 595 millimicrons and 530 millimicrons. The intensities follow in the sequence I, II and III.

The bacteriostatic properties of isochlorophyllin-*a*-sodium have been investigated with special attention to the effect upon tubercle bacilli of both avian and human strains. For this purpose 25 milligrams of isochlorophyllin-*a*-sodium were dissolved in 100 cc. portions of 4 percent glycerine broth or Sauton's medium in 250 cc. Erlenmeyer flasks and the solution sterilized in the Arnold for 45 minutes on two successive days. The pH value of the medium was determined by the glass electrode and found to be about 7.15 to about 7.60. A plurality of flasks containing the several media containing isochlorophyllin-*a*-sodium in the above concentration were inoculated with young actively growing pellicles of avian or human-37 tubercle bacilli and incubated at 37° C. in the dark for periods of about 21 to about 42 days. Examination of the data obtained by the foregoing tests shows that the isochlorophyllin-*a*-sodium definitely retarded the growth of both the avian and the human strains of tubercle bacilli. The inocula on the media containing isochlorophyllin-*a*-sodium showed very slight filmy growths while the control bacilli showed luxuriant growths covering the whole surfaces of the flask and encroaching on the side walls. To test the viability of the bacilli which had been incubated in the presence of isochlorophyllin-*a*-sodium transplants were made into control media free from isochlorophyllin-*a*-sodium. Normal luxuriant growth of the avian strain occurred within 9 days and the bacilli of the human-37 strain showed good growth in 16 days indicating that the compounds were bacteriostatic in the concentrations used. Both organisms on all media retained their original morphological and acid-fast properties. Repetition of the foregoing tests but using an amount of isochlorophyllin-*a*-sodium equivalent to 0.050% was made and found to be effective.

It is well known to those skilled in the art that the following are the descriptive names for the chlorophyll derivatives mentioned hereinbefore in accordance with the nomenclature of the Geneva Convention:

Chlorophyll $a$=magnesium complex of 1,3,5,8-tetramethyl-4-ethyl-2-vinyl-9-oxo- 10-carbmethoxy-phorbine-7-propionic acid phytyl ester Chlorophyll $b$=magnesium complex of 1,5,8-trimethyl-4-ethyl-2-vinyl-3-formyl - 9 - oxo - 10-carbmethoxy-phorbine-7-propionic acid phytyl ester Methyl chlorophyllid $a$=magnesium complex of 1,3,5,8-tetramethyl-4-ethyl-2-vinyl-9-oxo - 10 - carbmethoxy-phorbine-7-propionic acid methyl ester Methyl chlorophyllid $b$=magnesium complex of 1,5,8-trimethyl-4-ethyl-2-vinyl-3-formyl - 9 - oxo-10-carbmethoxy-phorbine-7-propionic acid methyl ester Ethyl chlorophyllid $a$=magnesium complex of 1,3,5,8-tetramethyl-4-ethyl-2-vinyl-9-oxo - 10 - carbmethoxy-phorbine-7-propionic acid ethyl ester Ethyl chlorophyllid $b$=magnesium complex of 1,5,8-trimethyl-4-ethyl-2-vinyl - 3 - formyl-9-oxo-10-carbmethoxy - phorbine - 7 - propionic acid ethyl ester Free chlorophyllid $a$=magnesium complex of 1,3,5,8-tetramethyl-4-ethyl-2-vinyl-9-oxo - 10 - carbmethoxy-phorbine-7-propionic acid Free chlorophyllid $b$=magnesium complex of 1,5,8-trimethyl-4-ethyl-2-vinyl-3-formyl - 9 - oxo-10-carbmethoxy - phorbine - 7 - propionic acid Phytylpheophorbide $a$=pheophytin $a$=1,3,5,8-tetramethyl-4-ethyl-2-vinyl-9-oxo - 10 - carbmethoxy-phorbine-7-propionic acid phytyl ester Phytyl pheophorbide $b$=pheophytin $b$=1,5,8-trimethyl-4-ethyl-2-vinyl-3-formyl - 9 - oxo - 10 - carbmethoxy-phorbine-7-propionic acid phytyl ester Methyl pheophorbide $a$=1,3,5,8-tetramethyl-4-ethyl-2-vinyl-9-oxo - 10 - carbmethoxy - phorbine-7-propionic acid methyl ester Methyl pheophorbide $b$=1,5,8-trimethyl-4-ethyl-2-vinyl-3-formyl-9-oxo-10-carbmethoxy-phorbine-7-propionic acid methyl ester Ethyl pheophorbide $a$=1,3,5,8-tetramethyl - 4 - ethyl-2-vinyl-9-oxo-10-carbmethoxy-phorbine-7-propionic acid ethyl ester Ethyl pheophorbide $b$=1,5,8-trimethyl-4-ethyl-2-vinyl-3-formyl-9-oxo-10-carbmethoxy-phorbine-7-propionic acid ethyl ester Free pheophorbide $a$=pheophorbide $a$=1,3,5,8-tetramethyl-4-ethyl-2-vinyl-9-oxo - 10 - carbmethoxy-phorbine-7-propionic acid Free pheophorbide $b$=pheophorbide $b$=1,5,8-trimethyl-4-ethyl-2-vinyl-3-formyl - 9 - oxo - 10-carbmethoxy-phorbine-7-propionic acid Phytochlorin $e$=phytochlorin $e$-6=1,3,5,8-tetramethyl-4-ethyl-2-vinyl-chlorine - 6 - carbonic acid-gamma-acetic acid-7-propionic acid Phytorhodin $g$=phytorhodin-$g$-7 = 1,5,8 - trimethyl-4-ethyl-2-vinyl-3-formyl-chlorine - 6 - carbonic acid-gamma-acetic acid-7-propionic acid Isochlorophyllin $a$=magnesium complex of 1,3,5,8-tetramethyl-4-ethyl-2-vinyl - chlorine-6-carbonic acid-gamma-acetic acid-7-propionic acid Isochlorophyllin $b$=magnesium complex of 1,5,8-trimethyl-4-ethyl-2-vinyl-3-formyl - chlorine-6-carbonic acid-gamma-acetic acid-7-propionic acid Phytochlorin-$f$=1,3,5,8-tetramethyl-4-ethyl - 2 - vinyl-chlorine-6-carbonic acid-7-propionic acid Trimethyl ester of phytochlorin $e$=1,3,5,8-tetramethyl-4-ethyl-2-vinyl-chlorine - 6 - carbonic acid-gamma-acetic acid-7-propionic acid trimethyl ester Copper complex of tri-methyl ester of phytochlorin $e$=copper complex of 1,3,5,8-tetramethyl-4-ethyl-2-vinyl-chlorine - 6 - carbonic acid-gamma-acetic acid-7-propionic acid trimethyl ester Tri-sodium salt of copper complex of phytochlorin $e$=copper complex of 1,3,5,8-tetramethyl-4-ethyl-2-vinyl - chlorine - 6 - carbonic acid-gamma-acetic acid-7 propionic acid tri-sodium salt Although the present invention has been described in conjunction with certain preferred embodiments, variations and modifications may be made as those skilled in the art will readily understand. It is to be understood that such variations and modifications are to be considered within the purview of the specification and the scope of the appended claims.

I claim:

1. A process for making isochlorophyllin-$a$-sodium which comprises refluxing one part of chlorophyll $a$ with 10 parts of caustic soda in methyl alcohol for at least two hours with the exclusion of carbon dioxide to obtain a reaction mass containing isochlorophyllin-$a$-sodium, chilling the reaction mass to below about 10° C. and maintaining said reaction mass at a temperature below about 10° C. for a period of time sufficient that solid material containing isochlorophyllin-$a$-sodium is precipitated, separating said solid material from the reaction mass, washing said solid material containing isochlorophyllin-$a$-sodium with absolute ethanol, washing said solid material containing isochlorophyllin-$a$-sodium with petroleum ether to obtain washed solid material containing isochlorophyllin-$a$-sodium, dissolving said washed solid material containing isochlorophyllin-$a$-sodium in 95% ethanol to obtain an ethanol solution of isochlorophyllin-$a$-sodium, adding absolute ethanol and petroleum ether to said ethanol solution to precipitate isochlorophyllin-$a$-sodium, separating said isochlorophyllin-$a$-sodium from said ethanol solution, washing said isochlorophyllin-$a$-sodium with absolute ethanol and then with petroleum ether to obtain isochlorophyllin-$a$-sodium of high purity, and drying said isochlorophyllin-$a$-sodium of high purity in a vacuum.

2. A process for making isochlorophyllin-$a$-sodium which comprises reacting chlorophyll $a$ with a methyl alcohol solution of caustic soda at the boiling point of the mixture until a solution containing isochlorophyllin-$a$-sodium is obtained, cooling said solution to a temperature of about 10° C. and maintaining said solution at said temperature until substantially all of said isochlorophyllin-$a$-sodium has precipitated out to obtain an impure precipitate containing isochlorophyllin-$a$-sodium, separating said impure precipitate from said solution, washing said impure precipitate to remove unreacted chlorophyll $a$ and other contaminants, re-dissolving said impure precipitate in 95% ethanol, adding absolute ethanol and petroleum ether to said ethanol solution to precipitate purified isochlorophyllin-*a*-sodium, washing said purified isochlorophyllin-*a*-sodium successively with absolute ethanol and then with petroleum ether to obtain isochlorophyllin-*a*-sodium of high purity and drying said isochlorophyllin-*a*-sodium of high purity in vacuum.

3. A process for making isochlorophyllin-*a*-sodium which comprises reacting a reaction mass containing chlorophyll *a* and sodium hydroxide in methyl alcohol solution in the presence of an inert gas at the boiling point of the reaction mass to form a solution containing isochlorophyllin-*a*-sodium, cooling said solution to about 10° C. to obtain a precipitate containing isochlorophyllin-*a*-sodium and contaminants, separating said precipitate containing isochlorophyllin-*a*-sodium from said solution, washing said precipitate containing isochlorophyllin-*a*-sodium with absolute ethyl alcohol and then petroleum ether to obtain a washed precipitate, dissolving said washed precipitate in 95% ethyl alcohol to obtain an ethyl alcohol solution containing isochlorophyllin-*a*-sodium, adding absolute ethyl alcohol and petroleum ether to said ethyl alcohol solution containing isochlorophyllin-*a*-sodium to precipitate purified isochlorophyllin-*a*-sodium, washing said purified isochlorophyllin-*a*-sodium successively with absolute ethanol and petroleum ether to obtain isochlorophyllin-*a*-sodium of high purity, and drying said isochlorophyllin-*a*-sodium of high purity in vacuum.

4. A process for producing isochlorophyllin-*a*-sodium which comprises reacting a mixture of chlorophyll *a* and sodium hydroxide in methyl alcohol solution in the absence of carbon dioxide at the boiling point of the mixture for at least two hours to obtain a solution containing isochlorophyllin-*a*-sodium, chilling said solution to precipitate an impure isochlorophyllin-*a*-sodium, separating said impure isochlorophyllin-*a*-sodium from said mixture, washing said impure isochlorophyllin-*a*-sodium successively with absolute ethyl alcohol and petroleum ether, dissolving said washed isochlorophyllin-*a*-sodium in 95% ethyl alcohol to form a solution of isochlorophyllin-*a* sodium in 95% alcohol, re-precipitating said isochlorophyllin-*a*-sodium, and drying said re-precipitated isochlorophyllin-*a*-sodium in vacuum.

5. A process for producing isochlorophyllin-*a*-sodium which comprises reacting chlorophyll *a* with sodium hydroxide in methyl alcohol solution in the absence of carbon dioxide at the boiling point thereof to form isochlorophyllin-*a*-sodium and to precipitate the same, completing the precipitation of more of said isochlorophyllin-*a*-sodium from said methyl alcohol solution, redissolving the aforesaid precipitate and re-precipitating said isochlorophyllin-*a*-sodium to purify the same, and drying said isochlorophyllin-*a*-sodium in vacuum.

ERIC G. SNYDER.